P. M. GELATT.
PRESSURE GAGE.
APPLICATION FILED APR. 3, 1916.

1,254,672.

Patented Jan. 29, 1918.

Witnesses
Charles Bale
Anna M. Dorr

Inventor
Philo M. Gelatt
By Barthel & Barthel
Attorneys

UNITED STATES PATENT OFFICE.

PHILO M. GELATT, OF LA CROSSE, WISCONSIN, ASSIGNOR TO NATIONAL GAUGE AND EQUIPMENT CO., OF LA CROSSE, WISCONSIN, A CORPORATION OF WISCONSIN.

PRESSURE-GAGE.

1,254,672.

Specification of Letters Patent.   Patented Jan. 29, 1918.

Application filed April 3, 1916. Serial No. 88,606.

*To all whom it may concern:*

Be it known that I, PHILO M. GELATT, a citizen of the United States of America, residing at La Crosse, in the county of La Crosse and State of Wisconsin, have invented certain new and useful Improvements in Pressure-Gages, of which the following is a specification, reference being had therein to the accompanying drawings.

In the operation of pressure gages of the Bourdon tube type in which the tendency of a curved tube to expand under pressure is employed to operate mechanism for moving an indicator across the scale, it is desirable that the tube be so arranged as not to become permanently deformed when exposed to pressure beyond the range for which the gage is ordinarily intended. That is, if the gage registers only a few pounds but is accidentally exposed to pressure of many more pounds, it is necessary that the tube be so disposed as not to become permanently deformed by such pressure and thereby render the gage inactive. As the tube must be sensitive for low pressure, the tube must necessarily be very responsive to such pressure and accordingly light.

This invention relates to a pressure gage and to an arrangement thereof whereby excessive pressure beyond that for which the gage is calculated does not injure the Bourdon tube which forms the actuating member thereof and whereby accuracy and sensitiveness of the gage are maintained under comparatively rough usage.

The invention consists in the matters hereinafter set forth, and more particularly pointed out in the appended claim.

Figure 1:
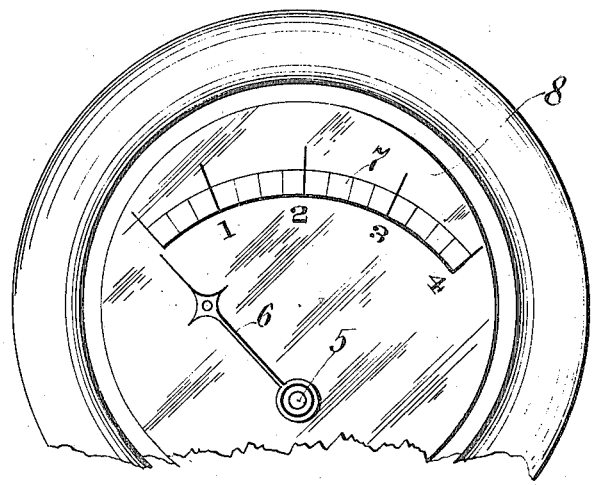
Figure 1 is a plan view of a gage that embodies features of the invention, partially broken away.
Figures 2, 4:
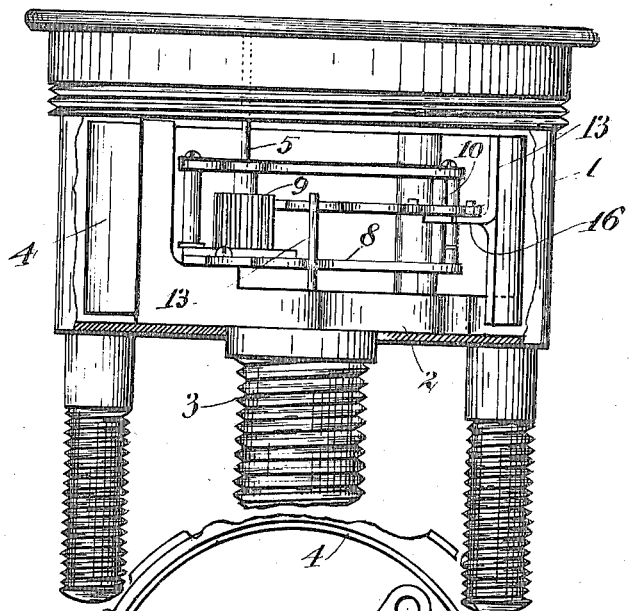
Fig. 2 is a view in side elevation partially shown broken away to give clear view.
Fig. 4 is a view in cross section through the tube itself with the walls thereof exaggerated in order to give clear view.
Figure 3:
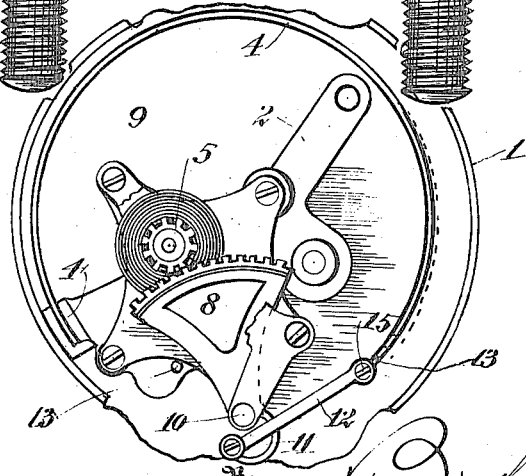
Fig. 3 is a plan view of the mechanism, partially broken away, with the dial plate removed.

As herein shown, a casing 1 that is preferably circular, affords support for a base member 2 or plate, that has a nipple 3 extending therethrough with screwthreaded exterior or other provision for attachment to a pressure pipe. The base has an upstanding hollow stub in communication through channels not indicated with the bore of the nipple 3, that affords support for the inlet end of a flat Bourdon tube 4 of conventional type that is curved to be slightly eccentric with and smaller than the encompassing casing 1.

A spring returned spindle 5 that carries an indicator 6 adapted to traverse a scale 7 on the dial plate, is operated from the free end of the tube by any suitable mechanism. As herein indicated in one form, a segmental gear 8 meshing with a pinion 9 that operates the spindle 5, is suitably pivoted to swing in a plane parallel to the plane of motion of the Bourdon tube 4, as on a pivot 10 or the like. An arm 11 of the segmental gear is coupled by a link 12 to the end of the tube, preferably by means of a reinforcing clip 16 soldered or brazed to the tube end with an out-turned gear that is bent into the plane of the link and connected thereto by a suitable pin 15. The arm 11 is curved and is bendable to a certain extent so that the relative movements of the indicator 6 and the free end of the tube 4 may be made to correspond.

The link 12 is so disposed regardless of the slight adjustment of the arm 11 as to exert a pull that is substantially tangent to the tube. A stop 13 suitably mounted on the base arrests the movement of the segment 8 when the indicator reaches a predetermined position. Thus, when this predetermined limit of motion is reached, the tube is fixedly supported at each end only and any excess pressures tend to distort the wall in a cross-sectional radial direction instead of exerting a straightening effect on the arc of the tube. The tube is therefore able to resist without deformation, pressures which would otherwise permanently distort it and ruin the gage. The adjustment afforded by the bendable arm to which the link is pivoted permits ready assembling and mounting of the index and scale.

Obviously, changes in the details of construction may be made without departing from the spirit of my invention but I do not care to limit myself to any particular form or arrangement of parts.

What I claim is:—

A pressure indicator comprising a substantially cylindrical casing having a dial face and scale thereon, a spindle journaled in the casing, an indicator secured on the spindle to traverse the scale, a spring coiled around the spindle and adapted to return the latter to initial position, a segmental gear journaled to oscillate in the casing, a pinion on the spindle in mesh with the gear, a Bourdon tube secured at one end to lie substantially concentric with the casing and out of contact therewith except at the fixed end thereof, a bendable curved arm extending from the hub of the segmental gear oppositely to the body thereof, a link extending tangentially from the free end of the Bourdon tube to which it is pivoted to the free end of the curved arm to which it is pivoted, and a stop adapted to arrest the segmental gear when the indicator has reached the outer limit of motion on the scale.

In testimony whereof, I affix my signature in presence of two witnesses.

PHILO M. GELATT.

Witnesses:
OTTO F. BARTHEL,
ANNA M. DORR.